United States Patent

Harvey et al.

(10) Patent No.: US 10,632,385 B1
(45) Date of Patent: Apr. 28, 2020

(54) SYSTEMS AND METHODS FOR CAPTURING PARTICIPANT LIKENESS FOR A VIDEO GAME CHARACTER

(71) Applicant: Electronic Arts Inc., Redwood City, CA (US)

(72) Inventors: Roy Harvey, Maitland, FL (US); Tom Waterson, Fareham (GB)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/118,125

(22) Filed: Aug. 30, 2018

Related U.S. Application Data

(63) Continuation of application No. 15/007,605, filed on Jan. 27, 2016, now Pat. No. 10,086,286.

(51) Int. Cl.
*A63F 13/65* (2014.01)
*A63F 13/655* (2014.01)
*A63F 13/825* (2014.01)
*A63F 13/213* (2014.01)

(52) U.S. Cl.
CPC ............ *A63F 13/65* (2014.09); *A63F 13/213* (2014.09); *A63F 13/655* (2014.09); *A63F 13/825* (2014.09)

(58) Field of Classification Search
USPC .......................................................... 463/31
See application file for complete search history.

(56) References Cited

U.S. PATENT DOCUMENTS

| | | | | |
|---|---|---|---|---|
| 2004/0104935 A1* | 6/2004 | Williamson | ............ | G06F 3/012 715/757 |
| 2004/0219980 A1* | 11/2004 | Bassett | ................... | A63F 13/10 463/33 |
| 2015/0297949 A1 | 10/2015 | Aman et al. | | |

* cited by examiner

*Primary Examiner* — Pierre E Elisca
(74) *Attorney, Agent, or Firm* — McDermott Will & Emery LLP

(57) ABSTRACT

Systems and methods for capturing participant likeness for a video game character are disclosed. In some embodiments, a method comprises receiving, at a pose generation system, multiple videos of one or more live events, the multiple videos recorded from a plurality of camera angles. A target participant may be identified, at the pose generation system, in the multiple videos. A set of poses may be generated, at the pose generation system, of the target participant from the multiple videos, the set of poses associated with a movement type or game stimulus. The set of poses may be received, at a model processing system, from the pose generation system. The method may further comprise generating, at the model processing system, a graphic dataset based on the set of poses, and storing, at the model processing system, the graphic dataset to assist in rendering gameplay of a video game.

20 Claims, 9 Drawing Sheets

SYSTEMS AND METHODS FOR CAPTURING PARTICIPANT LIKENESS FOR A VIDEO GAME CHARACTER

CROSS-REFERENCE TO RELATED APPLICATIONS

The present application claims the benefit of priority under 35 U.S.C. § 120 as a continuation from U.S. patent application Ser. No. 15/007,605, filed on Jan. 27, 2016. The disclosure of which is hereby incorporated by reference in its entirety for all purposes.

BACKGROUND

Technical Field

Embodiments of the present inventions relate generally to video games. More specifically, embodiments of the present inventions relate to systems and methods for acquiring a likeness of a target participant based on video recorded during one or more live events to assist in rendering gameplay of a video game.

Description of Related Art

Recent advances in computing technology have allowed video game developers and publishers to provide increasingly realistic character representations within a video game. Typically, an individual (e.g., actor, sports player, etc.) is brought into a production studio and fitted with a motion capture suit in order to capture their movements, and a character model is generated using the captured movements. This process is time consuming and expensive, and requires an extensive time lag between when the movements are captured and when they are available for rendering during gameplay.

SUMMARY

Typically, video game devices such as gaming consoles (e.g., PS3) render and display video game characters (e.g., football players) based on character models stored on the video game devices. Often, the video game character models are based on real players. At least some of the character models may be customized during video game development to approximate the physical characteristics of the real players. For example, a real player may be brought into a production studio and outfitted with a motion capture suit, and the resulting motion capture data is used to customize the character model of the real player. As stated above, this process is expensive and time consuming, and requires a significant time lag (e.g., several months) between capturing the motion data and providing renderable graphics data for gameplay.

Some embodiments described herein include systems and methods for acquiring a likeness of a target participant (e.g., a real football player) from videos captured from multiple cameras and/or multiple camera angles over the course of one or more live events, e.g., a football game, a football season, multiple football seasons, and so forth. The videos may be sent to a processing server. The processing server may identify silhouettes in the videos captured by the multiple cameras to generate poses of the target participant and to associate them with a movement type (e.g., stand, run, jump, sprint, spin, etc.) and/or game stimulus (e.g., winning, losing, fatigue, celebration, upset, fumble, etc.). In some embodiments, an administrator may watch the videos and identify the portion of the video and associate it with a movement type and/or game stimulus. Alternatively, the movement type and/or game stimulus may be identified based on a comparison of the poses generated from the videos against known poses or motion data associated with a movement type. The pose data, e.g., set of poses, may be used to customize character models.

Based on the silhouette data, e.g., the set of silhouettes obtained from the portions of the videos for the particular movement type, a character model may be generated, customized and/or refined to reflect the likeness of the target participant at the time of the video capture. In some embodiments, graphical information such as position data, vector data, animation data, wire frame data, skin data, etc. may be generated to identify the physical, skeletal, and movement characteristics of the target participant. A graphic dataset may be made available to assist in rendering gameplay on a user device so that the game character reflects a true likeness of the target participant when performing that movement.

The systems and methods described herein may be less expensive and less time consuming than traditional motion capture techniques. Further, turnaround time required to provide graphics data of captured movement for use during video gameplay may be greatly reduced. For example, a particular and/or unique movement performed by a target participant during a Sunday afternoon football game may be made available for rendering during gameplay by a user the following day.

In various embodiments, a system comprises a pose generation system and a model processing system. The pose generation system may include a motion capture analysis module configured to identify a target participant in multiple videos of one or more live events, the multiple videos recorded from a plurality of camera angles, and a pose module configured to generate a set of poses of the target participant from the multiple videos, the set of poses associated with a movement type and/or game stimulus. The model processing system may include a graphic processing module configured to generate a graphic dataset for the movement type based on the set of poses, and a data store configured to store the graphic dataset to assist in rendering a game character representative of the target participant during gameplay of a video game.

In some embodiments, the multiple videos comprise television broadcast videos of a plurality of live events, the television broadcast videos including video footage of the target participant from the plurality of camera angles for at least a portion of each of the plurality of live events.

In some embodiments, the target participant is identified at least partially based on metadata associated with the multiple videos. In related embodiments, the metadata includes at least one of RFID tracking information associated with the target participant, a uniform number associated with the target participant, a player name associated with the target participant, or a field position associated with the target participant.

In some embodiments, the movement type is selected from predetermined movement types.

In some embodiments, the graphics processing module generates the graphic dataset by customizing a character model with physical, skeletal and movement characteristics generated from the set of poses. In some embodiments, the graphic dataset includes position information associated with the movement type and/or game stimulus. In some embodiments, the graphic dataset includes a customized character model associated with the target participant.

In some embodiments, the silhouette module receives information identifying a time period within the multiple videos that corresponds to the movement type or game stimulus.

In some embodiments, the system further comprises a simulation engine configured to generate simulation results based on user input and game rules, and a rendering engine configured to use the graphic dataset to render the simulation results so that the game character representative of the target participant performs a movement clip that includes a likeness of the target participant In various embodiments, a method comprises receiving, at a pose generation system, multiple videos of one or more live events, the multiple videos recorded from a plurality of camera angles. A target participant may be identified, at the pose generation system, in the multiple videos. A set of poses may be generated, at the pose generation system, of the target participant from the multiple videos, the set of poses associated with a movement type and/or game stimulus. The set of poses may be received, at a model processing system, from the pose generation system. The method may further comprise generating, at the model processing system, a graphic dataset based on the set of poses, and storing, at the model processing system, the graphic dataset to assist in rendering gameplay of a video game.

In some embodiments, the multiple videos may comprise television broadcast video of a plurality of live events, the television broadcast video including video footage of the target participant from the plurality of camera angles for at least a portion of each of the plurality of live events.

In some embodiments, the target participant may be identified at least partially based on metadata associated with the multiple videos. In related embodiments, the metadata may include any of RFID tracking information associated with the target participant, a player number associated with the target participant, or a player name associated with the target participant.

In some embodiments, the movement type may be selected from the plurality of predetermined movement types.

In some embodiments, the generating of the graphic dataset may include customizing a character model based on physical, skeletal and movement characteristics generated from the set of poses. In some embodiments, the graphic dataset may include position information associated with the movement type and/or game stimulus. In some embodiments, the graphic dataset may include a customized character model associated with the target participant.

In some embodiments, the method may further comprise receiving information identifying a time period within the multiple videos that corresponds to the movement type and/or game stimulus.

In some embodiments, the method may further comprise generating simulation results based on user input and game rules, and using the graphic dataset to render the simulation results so that the game character representative of the target participant performs a movement clip that includes a likeness of the target participant.

In various embodiments, a non-transitory computer readable medium comprising executable instructions, the instructions being executable by a processor to perform a method, the method comprising receiving, at a pose generation system, multiple videos of one or more live events, the multiple videos recorded from a plurality of camera angles. A target participant may be identified, at the pose generation system, in the multiple videos. A set of poses may be generated, at the pose generation system, of the target participant from the multiple videos, the set of poses associated with a movement type and/or game stimulus. The set of poses may be received, at a model processing system, from the pose generation system. The method may further comprise generating, at the model processing system, a graphic dataset based on the set of poses, and storing, at the model processing system, the graphic dataset to assist in rendering gameplay of a video game.

DETAILED DESCRIPTION

Figure 1:
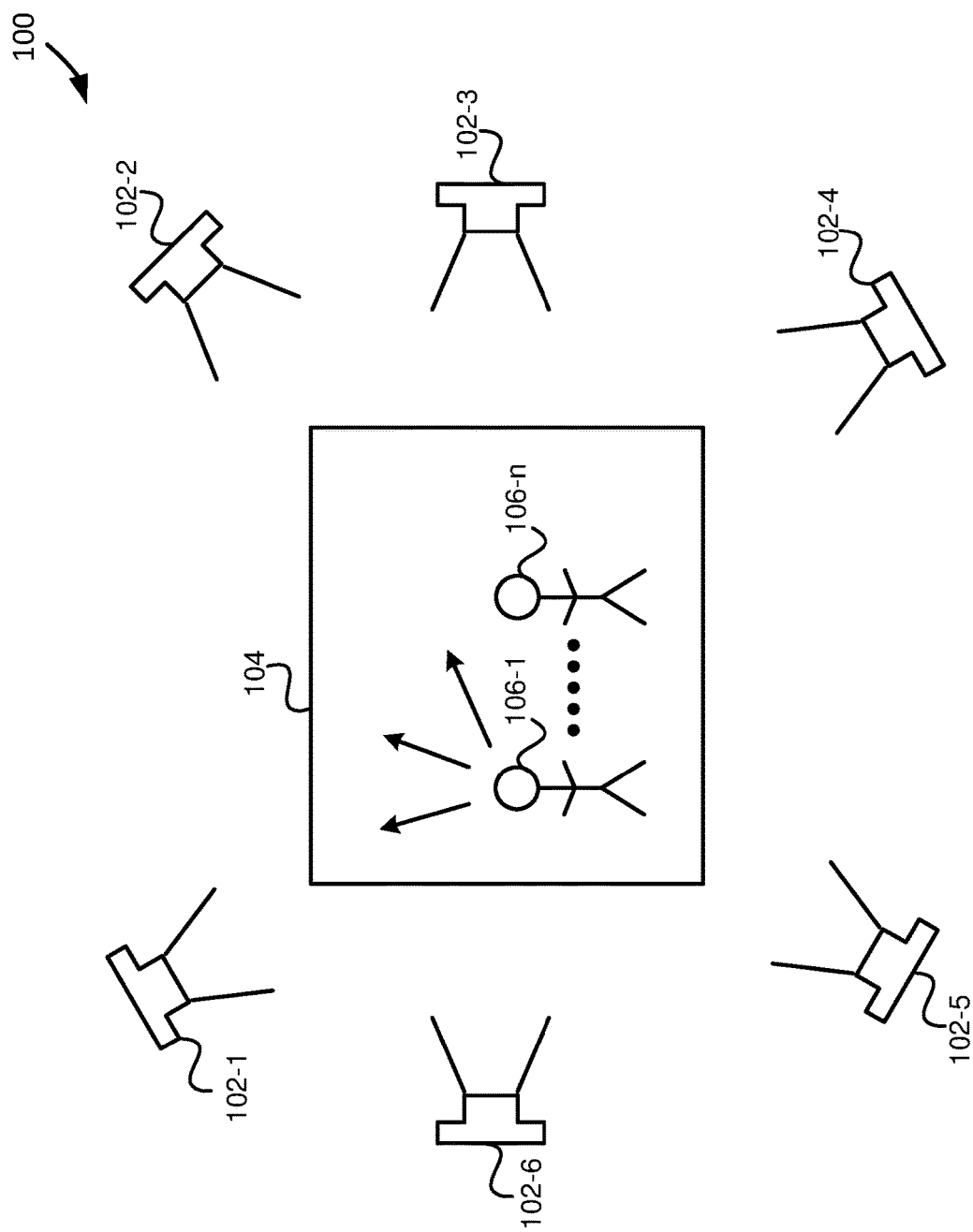
FIG. 1 illustrates a diagram of a system and environment for capturing video of one or more live events from multiple camera angles, in accordance with some embodiments of the present invention.

Typically, video game devices such as gaming consoles (e.g., PS3) render and display video game characters (e.g., football players) based on character models stored on the video game devices. Often, the video game character models are based on real players. At least some of the character models may be customized during video game development to approximate the physical characteristics of the real players. For example, a real player may be brought into a production studio and outfitted with a motion capture suit, and the resulting motion capture data is used to customize the character model of the real player. As stated above, this process is expensive and time consuming, and requires a significant time lag (e.g., several months) between capturing the motion data and providing renderable graphics data for gameplay.

Some embodiments described herein include systems and methods for acquiring a likeness of a target participant (e.g., a real football player) from videos captured from multiple cameras and/or multiple camera angles over the course of one or more live events, e.g., a football game, a football season, multiple football seasons, and so forth. The videos may be sent to a processing server. The processing server may identify poses in the videos captured by the multiple cameras to generate poses of the target participant and to associate them with a movement type (e.g., stand, run, jump, sprint, spin, etc.) and/or game stimulus (e.g., winning, losing, fatigue, celebration, upset, fumble, etc.). In some embodiments, an administrator may watch the videos and identify the portion of the video and associate it with a movement type and/or game stimulus. Alternatively, the movement type and/or game stimulus may be identified based on a comparison of the poses generated from the videos against known poses or motion data associated with a movement type. The pose data, e.g., set of poses, may be used to customize character models.

Based on the pose data, e.g., the set of poses obtained from the portions of the videos for the particular movement type, a character model may be generated, customized and/or refined to reflect the likeness of the target participant at the time of the video capture. In some embodiments, graphical information such as position data, vector data, animation data, wire frame data, skin data, etc. may be generated to identify the physical, skeletal, and movement characteristics of the target participant. A graphic dataset may be made available to assist in rendering gameplay on a user device so that the game character reflects a true likeness of the target participant when performing that movement.

The systems and methods described herein may be less expensive and less time consuming than traditional motion capture techniques. Further, turnaround time required to provide graphics data of captured movement for use during video gameplay may be greatly reduced. For example, a particular and/or unique movement performed by a target participant during a Sunday afternoon football game may be made available for rendering during gameplay by a user the following day.

FIG. 1 illustrates a diagram of a video capture system 100 for capturing multiple videos of one or more live events from multiple camera angles. As shown, the video capture system 100 includes six cameras 102-1 to 102-6 (individually, camera 102; collectively, cameras 102), each positioned at a different angle relative to a target area 104. The target area 104 may comprise, for example, a sporting venue (e.g., a football field) or other type of venue supporting live events (e.g., a music concert venue). The cameras 102 may comprise, for example, HD, 4K, and/or UHD video cameras. It will be appreciated that although six cameras 102 are shown, other embodiments may include a greater or lesser number of such cameras 102 and/or arranged in a similar or different configuration, including at different heights and/or across more than one venue.

The cameras 102 may capture videos of one or more target participants 106-1 to 106-n (individually, target participant 106; collectively, target participants 106) in the target area 104 from multiple camera angles. The target participants 106 may comprise, for example, players in a sporting event (e.g., football players) or other type of participant in a live event (e.g., musician). In some embodiments, the cameras 102 may capture multiple videos of the target participant 106-1 from multiple camera angles over a predetermined amount of time, e.g., one or more games, seasons, etc., and the captured video may be combined into single video, or set(s) of video, associated with the target participant 106-1.

In some embodiments, the target participants 106 may be identifying by identifying attributes, such as player name, player number, and so forth. Additionally or alternatively, the target participants 106 may be outfitted with one or more sensors for supporting identifying his or her position and/or movement within the target area 104 of the videos. For example, the sensors may include RFID sensors. These and other identifying attributes may be included in metadata associated with the video, as discussed further below.

Figure 2:
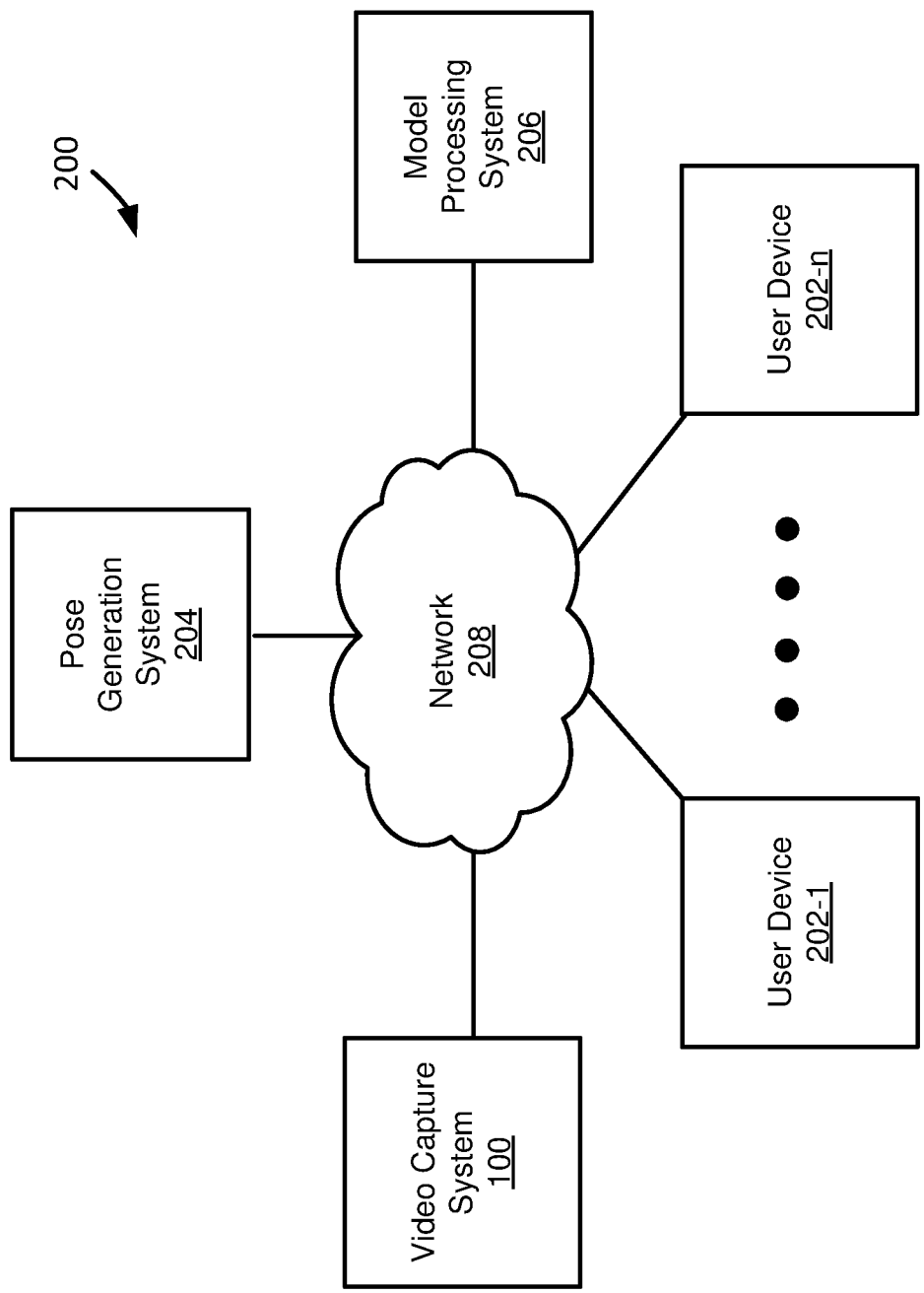
FIG. 2 illustrates a diagram of a system for acquiring a likeness of a target participant based on video recorded during one or more live events from multiple camera angles, in accordance with some embodiments of the present invention.

FIG. 2 illustrates a diagram of a system 200 for capturing a likeness of a target participant (e.g., target participant 106-1) based on videos recorded during one or more live events from multiple camera angles (e.g., by the cameras 102). Generally, likeness may include physical characteristics (e.g., height, weight, body dimensions), skeletal characteristics (e.g., posture, joint angles), and movement characteristics of a target participant. In some embodiments, the system 200 may generate graphic datasets based on the likeness of the target participant and store and/or transmit the graphic datasets to assist in rendering gameplay of a video game of the player representing the target participant. In a specific implementation, the system 200 includes user devices 202-1 to 202-n (collectively, the user devices 202), a pose generation system 204, a model processing system 206, the video capture system 100, and a communications network 208. In various embodiments, one or more digital devices may comprise the user devices 202, the pose generation system 204, the model processing system 206, and the communications network 208. It will be appreciated that a digital device may be any device with a processor and memory, such as a computer. Digital devices are further described herein.

The pose generation system 204 is configured to generate one or more sets of poses (e.g., three-dimensional poses) of a target participant (e.g., target participant 106-1) from the videos captured by one or more cameras (e.g., the cameras 102). In some embodiments, a pose of a target participant is generated from one or more frames of one or more videos, and for each of the multiple cameras angles. The individual poses can be aggregated into one or more sets of poses associated with a target participant and associated with a movement type and/or game stimulus. In some embodiments, a user (e.g., an administrator) may tag a set of poses with a particular movement type and/or game stimulus, and/or the set of poses may be tagged automatically by the pose generation system, e.g., based on a comparison with a previously tagged set or sets of poses. In some embodiments, the user can identify a time range in video clips corresponding to a particular movement type and/or a particular game stimulus. The video clips may be used to generate the set of poses corresponding to the movement type and/or game stimulus. In various embodiments, a movement type may include, for example, standing, gait, walk, run, jump, spin, and so forth, as discussed further below. A game stimulus may include, for example, winning, losing, upset, fatigue (e.g., near end of game, after a long run, etc.), fumble, etc.

The model processing system 206 is configured to generate graphical data based on one or more sets of poses to capture a likeness of a target participant (e.g., target participant 106-1) performing a particular movement and/or in response to a particular game stimulus. In some embodiments, the model processing system 206 stores one more character models (e.g., 3D character models). The character models may include physical, skeletal, and/or movement characteristics. The model processing system 206 may use the character models to generate customized character models, e.g., character models having values more closely reflecting a likeness of the target participant when performing a movement, or to generate graphic information (e.g., joint angles, postural information, motion information) that can be provided to the user device for replicating the likeness of the players during gameplay.

For example, a default sequence of poses may represent a default character model performing a default jump movement when he is fatigued. The default sequence of poses of the default character model may be adjusted based on a comparison of the default poses with set of poses to generate the customized character model or graphic data to include the jump movement of the target participant when the target participant is fatigued. The customized character model or graphic data set for the jump movement of the target participant may be used to render the game character with the likeness of the real person. It will be appreciated that the graphic data may be the customized character model.

In some embodiment, the pose generation system 204 and/or the model processing system 206 may comprise hardware, software, and/or firmware. The pose generation system 204 and/or the model processing system 206 may be coupled to or otherwise in communication with a communication network 208. In some embodiments, the pose generation system 204 and/or the model processing system 206 may comprise software configured to be run (e.g., executed, interpreted, etc.) by one or more servers, routers, and/or other devices. For example, the pose generation system 204 and/or the model processing system 206 may comprise one or more servers, such as a windows 2012 server, Linux server, and the like. Those skilled in the art will appreciate that there may be multiple networks and the pose generation system 204 and/or the model processing system 206 may communicate over all, some, or one of the multiple networks. In some embodiments, the pose generation system 204 and/or the model processing system 206 may comprise a software library that provides an application program interface (API). In one example, an API library resident on the pose generation system 204 and/or model processing system 206 may have a small set of functions that are rapidly mastered and readily deployed in new or existing applications. There may be several API libraries, for example one library for each computer language or technology, such as, Java, .NET or C/C++ languages.

The user devices 202 may include any physical or virtual digital device that can execute a video game application (e.g., EA Sports Madden Football). For example, a user device 202 may be a video game console (e.g., PS3, Xbox One, Nintendo, etc.), laptop, desktop, smartphone, mobile device, and so forth. In some embodiments, executing the video game application on a user device 202 may comprise remotely accessing a video game application executed on another digital device (e.g., another user device 202, server, and so forth).

While many user devices 202 may be different, they may share some common features. For example, the user devices 202 may have some method of capturing user input such as a keyboard, remote control, touchscreen, joystick, or the like. Different user devices 202 may also have some method of displaying a two-dimensional or three-dimensional image using a display such as a TV screen (e.g., LED, LCD, or OLED) or touchscreen. The user devices 202 may have some form of processing CPU, although the capability often widely varies in terms of capability and performance.

In various embodiments, one or more users (or, "players") may utilize each user device 202 to play one or more games (e.g., a sports game, a turn-based game, a first-person shooter, etc.). Each user device 202 may display a user interface associated with the desired game. The user interface may be configured to receive user selections (e.g., user input) for gameplay. For example, there may be any number of menus that provide opportunity for player selection via buttons, radio buttons, check boxes, sliders, text fields, selectable objects, moveable objects, and/or the like.

The content of the user interface may be generated and/or selected based on game rules and/or a current game state. Game rules and the current game state may dictate options from which the player may choose. Once the player provides selection(s), in some embodiments, a simulation may be performed to determine the result of the player selection(s) in the context of game play (e.g., utilizing the current game state). In some embodiments, the simulation is conducted locally (e.g., a player utilizing the user device 202-1 inputs selection(s) and the user device 202-1 performs the simulation) based on the game rules. In various embodiments, the simulation may be performed by another digital device. For example, the user device 202-1 may provide the selection(s) and/or the current game state to a remote server (not shown) via the communication network 208. The remote server may perform the simulation based on the game rules, the player selection(s), and/or the current game state.

Figure 7:
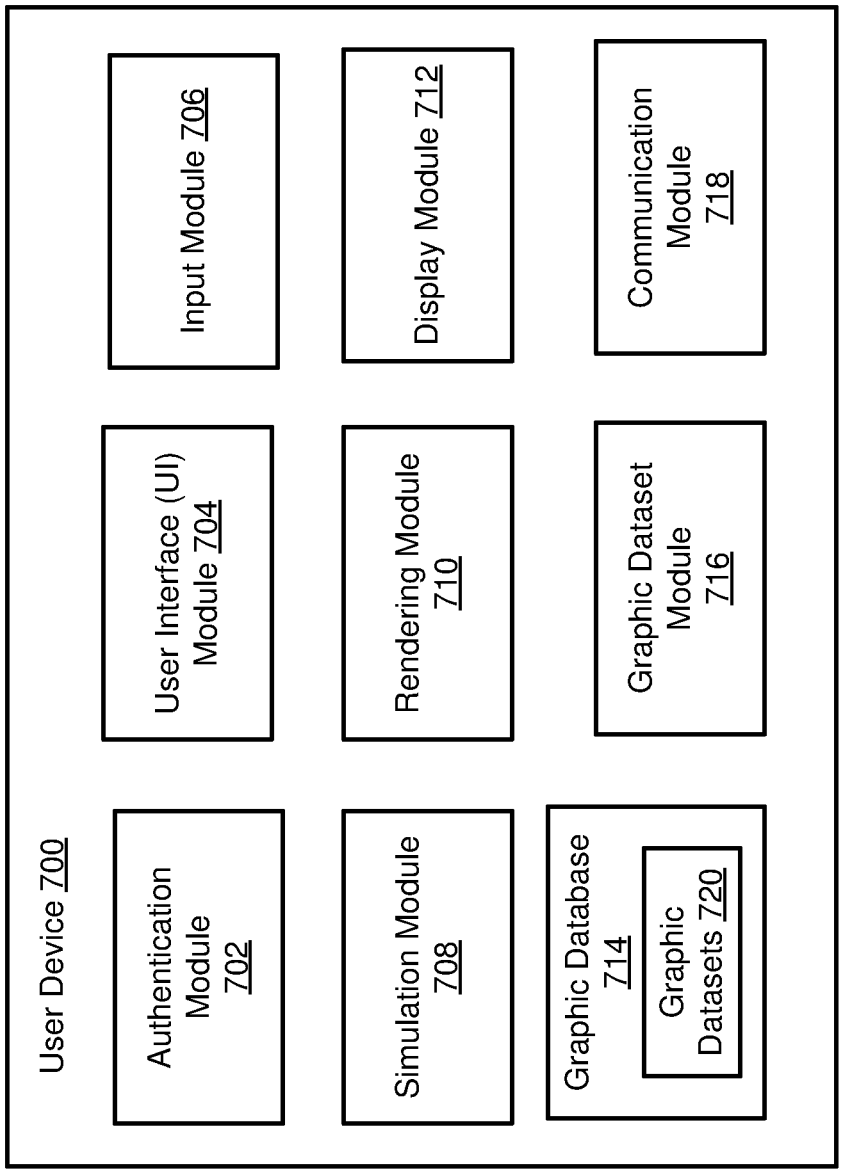
FIG. 7 is a block diagram of a user device, in accordance with some embodiments of the present invention.

Once the simulation results are obtained, whether performed locally or remotely, the simulation results need to be rendered, either locally or remotely. The rendering engine, which may be on the user device 202 as shown in FIG. 7, can use the customized character models to render the likeness of the target participants during gameplay. As described in more detail below, the rendering engine will select graphical datasets in order to render the simulation results. The rendering engine may select different graphical datasets to render the different gameplay clips so as to create a temporally accurate rendition of the likeness of the target participant, and so as to create variety in the movement of the target participant, e.g., so that the player representing the target participant uses the different jump sequences that the target participant uses in real life. The rendering engine may use the customized character models to generate the entire rendering of gameplay event, portions of the rendering of the gameplay event, and/or extra-gameplay clips.

In some embodiments, the communications network 208 represents one or more network(s). The communications network 208 may provide communication between the user devices 202, the pose generation system 204, the model processing system 206 and/or the video capture system 100. In some examples, the communication network 208 comprises digital devices, routers, cables, and/or other network topology. In other examples, the communication network 208 may be wireless and/or wireless. In some embodiments, the communication network 208 may be another type of network, such as the Internet, that may be public, private, IP-based, non-IP based, and so forth.

It will be appreciated that, although the system herein is being described with regard to capturing physical, skeletal and movement characteristics of a target participant, the system herein can be used in a similar manner to capture facial and other microexpression characteristics of the target participant, possibly in relation to game stimuli. It may be necessary to have cameras of sufficiently high definition capable of capturing the facial and/or microexpressions at a distance, or close-up cameras, e.g., on the a target participant's helmet, to capture the facial and/or microexpressions.

Figure 3:
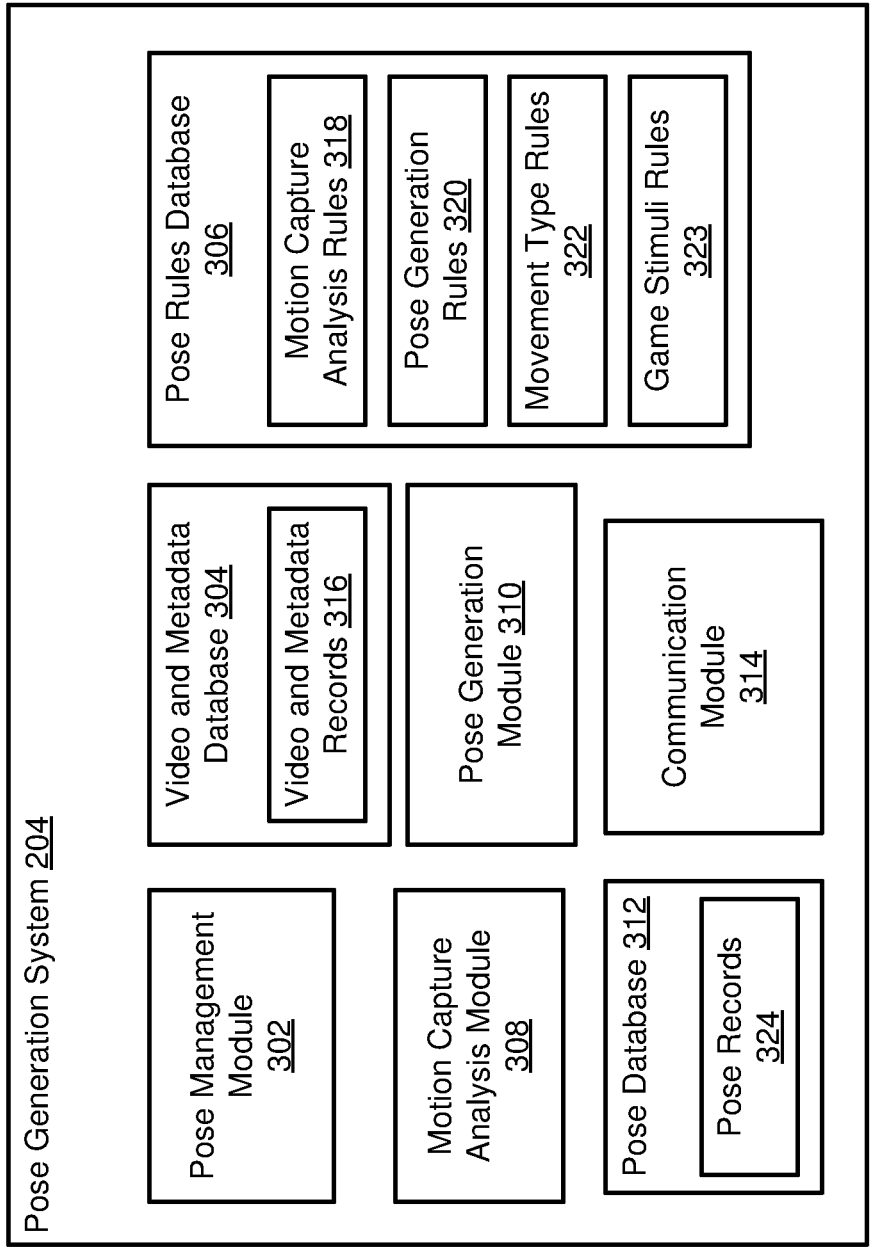
FIG. 3 is a block diagram of an example pose generation system, in accordance with some embodiments of the present invention.

FIG. 3 is a block diagram of an example pose generation system 204 according to some embodiments. Generally, the pose generation system 204 may analyze videos recorded from multiple cameras (e.g., the cameras 102) and/or multiple camera angles to identify a target participant (e.g., target participant 106-1) and generate a set of pose of the target participant for a particular movement type and/or game stimulus. Notably, the pose generation system 204 need not generate a pose for each frame of a video. It may generate a pose for particular frames, e.g., every other frame, every n frames, etc. The pose generation system 204 may include a pose management module 302, a video and metadata database 304, a pose rules database 306, a motion capture analysis module 308, a pose generation module 310, a pose database 312, and a communication module 314.

The pose management module 302 is configured to manage (e.g., create, read, update, delete, or access) video records 316 stored in the video and metadata database 304, rules 318-322 stored in the pose rules database 306, and/or pose records 324 stored in the pose database 312. The pose management module 302 may perform these operations manually (e.g., by an administrator interacting with a GUI) and/or automatically (e.g., by the motion capture analysis module 308 and/or the pose generation module 310, discussed below). In some embodiments, the pose management module 302 comprises a library of executable instructions which are executable by a processor for performing any of the aforementioned management operations. The databases 304, 306 and 312 may be any structure and/or structures suitable for storing the records 316 and/or rules 318-322 (e.g., an active database, a relational database, a table, a matrix, an array, and the like).

The video records 316 may each include videos in a variety of video formats, along with associated metadata. For example, the video formats may include broadcast video formats (e.g., as received from a television broadcast), a compressed video format (e.g., MPEG), and the like. As discussed above, the videos may include contemporaneous videos received from multiple cameras and multiple camera angles.

In various embodiments, metadata can be used, for example, to assist in identifying, (or "tagging") a target participant within a video, in identifying one or more movements performed by the target participant, in generating poses of the target participant, in generating and/or updating character model(s) associated with the targeting participant, and so forth. The metadata may include any of the following information:

Target Area Information: Target area type (e.g., football field), size of target area, shape of target area, and/or target area markers (e.g., hash marks, yard line markers, etc.).

Number of Cameras: The number of cameras and/or camera angles used to capture the video.

Camera Locations: The locations of each of the cameras relative to the target area.

Type of activity: The type of activity captured in the video, such as a sporting event, musical event, etc.

Participant images: One or more images of the target participant, such as a profile picture (or, "mugshot") of the target participant.

Uniform names and/or numbers

Uniform designs

Advanced Path Tracking Information (e.g., RFID): Path (s) taken by the target participant during the activity, e.g., routes run by the target participant during one or more football games.

In some embodiments, some or all of the metadata may comprise predetermined, or otherwise known, values received from an operator (e.g., an administrator interacting with a GUI), or other external source (e.g., the NFL or other organization associated with the video). In other embodiments, some or all of the metadata may comprise values determined based on an image analysis performed on the video by the pose generation system 206, e.g., alphanumeric character recognition to identify a player name and/or number of the target participant. In various embodiments, the metadata include alphanumeric values, descriptive values, images, and/or the like. In some embodiments, each metadata field in the records 316 may not include a value. In some embodiments, metadata fields without an assigned value may be given a NULL value and/or a default value.

The pose rules database 306 stores rules 318-323 for controlling a variety of functions for the pose generation system 204, including motion capture analysis rules 318 for analyzing the videos stored in the video records 316, pose generation rules 320 for generating sets of poses from the videos stored in the video records 316, movement type rules 322 for identifying movement types performed by a target participant, and/or game stimuli rules 323 for identifying game stimuli that are the likely circumstances that motivated the movement (e.g., behavior, expression, posture, gait, etc.). Other embodiments may include a greater or lesser number of such rules 318-323, stored in the rules database 306 or otherwise. In various embodiments, some or all of the rules 318-323 may be defined manually, e.g., by an administrator, and/or automatically by the pose generation system 204.

In some embodiments, the rules 318-323 define one or more attributes, characteristics, functions, and/or other conditions that, when satisfied, trigger the pose generation system 204, or component thereof (e.g., motion capture analysis module 308 or pose generation module 310) to perform one or more actions and/or identify circumstances when the movement is appropriate. For example, the database 306 may store any of the following rules:

Motion Capture Analysis Rules 318

The motion capture analysis rules 318 define attributes and/or functions for correlating different camera angle video images for the same time period of a live event, e.g., an 8 second time period corresponding to a particular football play. In some embodiments, some or all of the metadata is used to correlate the different camera angle images. Reference point locations (e.g., yard markers on a football field) may be determined based on some or all of the metadata (e.g., target area metadata), and the different camera angle video images can be correlated based on the reference point locations.

In some embodiments, the motion capture analysis rules 318 define attributes and/or functions to assist with identifying a target participant in the videos. In various embodiments, the target participants may be identified manually (e.g., by administrator watching the video) and/or automatically (e.g., by recognizing his name or uniform number). For example, the motion capture analysis rules 318 may define a pattern matching algorithm to match attributes of the target participant, such as uniform number, RFID information, etc. The motion capture analysis rules 318 may include rules to follow the target participant once he or she has been identified.

The motion capture analysis module 308 is configured to execute the motion capture analysis rules 318. Thus, for example, the motion capture analysis module 308 may analyze the videos stored in the records 316, using some or all of the associated metadata values, to correlate different camera angle video images, to identify a target participant, and/or to identify movements performed by the target participant.

Pose Generation Rules 320

The pose generation rules 320 define attributes and/or functions for generating a set of poses of a target participant from videos. Generally, one or more poses may be generated based on the pose generation rules 320 for one or more frames of one or more videos, and a sequence of poses may be aggregated into a set and associated with a movement type and/or game stimulus. In some embodiments, the target participant will be identified across the multiple videos and across multiple camera angles during a time period corresponding to a particular movement type and/or game stimulus. The pose generation rules 320 may assist in generating the set of poses for the particular movement type and/or game stimulus.

The pose generation module 310 is configured to execute the pose generation rules 320. Thus, for example, the pose generation module 310, using some or all of the associated metadata values stored in the records 316, may generate one or more sets of poses of a target participant from video stored in the records 316. The pose database 312 is configured to store the poses generated by the pose module 310 in the pose records 324.

Movement Type Rules 322

The movement type rules 322 define attributes and/or functions for identifying a movement type performed by a target participant. In some embodiments, a movement type is identified and/or selected from a predetermined set of movement types. For example, the set of movement types may include standing, gait, walk, run, sprint, spin, jump, throw, tackle, catch, celebrate, and so forth.

Identification of a movement type may be performed manually and/or automatically. In some manual embodiments, an administrator may view the video and manually tag the time period of the multiple videos as corresponding to a particular movement type.

Alternatively, or additionally, the movement type rules 322 may identify a movement type during a time period based on a comparison with known movements. For example, a jump event may be identified based on movement expectations associated with the movement type. In some embodiments, the movement type rules 322 may include a sequence of poses, velocity information, vector information, and/or other features and/or characteristics, of a walk, run, etc., generic to any target participant. These can be compared against data obtained from the sequence of poses, metadata associated with the set of poses, and/or the video itself to determine a particular movement type. For example, a velocity of a target participant may be calculated based on position data (e.g., based on RFID metadata), and subsequently compared. If the velocity is within a certain range, it may indicate a walk. If the velocity is within a higher range, it may indicate a sprint. If the velocity is within an even higher range, it may indicate a burst.

Game Stimuli Rules 323

The game stimuli rules 323 define attributes and/or functions for identifying a game stimuli that motivated a movement performed by a target participant. Upon identifying a particular movement, e.g., a dance movement, the game circumstances may be identified that were the cause of the movement (e.g., winning the game, a successful play, etc.).

Identification of a game stimulus may be performed manually and/or automatically. In some manual embodiments, an administrator may view the video and manually identify the game stimulus that motivated the particular movement type.

In some embodiments, each record 324 is associated with a target participant, and can store sets of poses based on movement type and/or game stimulus. For example, one or more sets of poses may be associated with a jump movement, wherein each of the sets of poses is generated from a different recorded jump movement of the target participant. Similarly, one or more sets of poses may be associated with a celebratory dance of the target participant. Accordingly, as more videos of a target participant is captured and analyzed, additional movements and/or variations of same movement can be stored in relation to the movement type and/or game stimulus.

In some embodiments, the system may capture a number of instances of a particular movement type during an event. For example, the system may capture ten jumps by a football player during a football game. The movement type rules 322 may instruct the system to look at statistical variations of the body mechanics to determine whether to group a first subset of the jump instances into a first jump variation, and a second subset of the jump instances into a second jump variation. The movement type rules 322 may instruct the system to average each of the graphics information to generate the average first jump variation and the average second variation. In some embodiments, the system may be given additional jump instances by the same target participant, e.g., in a second football game. The movement type rules 322 may instruct the system to evaluate the variation in the body mechanics to determine whether the jump instance belongs to one of the existing first or second jump variations, whether it should be used to influence (be averaged into) one of the existing first or second jump variations, whether it should be used to replace one of the existing first or second jump variations, whether it reflects a third jump variation, etc.

In some embodiments, the system may capture the game stimuli that motivated a movement or movement type during an event. For example, the system may capture several celebratory movements in response to one or more positive game events. The game stimuli rules 323 may instruct the system to evaluate the game circumstances to determine the game circumstances when a particular movement is occurring, to determine new movements occurring during a particular game circumstance, to determine whether new game circumstances should be added that motivate a particular movement, etc.

The communication module 314 is configured to provide communication between the pose generation system 204, the model processing system 206, the user devices 202 and/or the video capture system 100 via the network 208. The communication module 314 may also be configured to transmit and/or receive encrypted communications (e.g., VPN, HTTPS, SSL, TLS, and so forth). In some embodiments, more specifically, the communication module 314 is configured to transmit poses generated by the system 204 to the model processing system 206.

Figure 4:
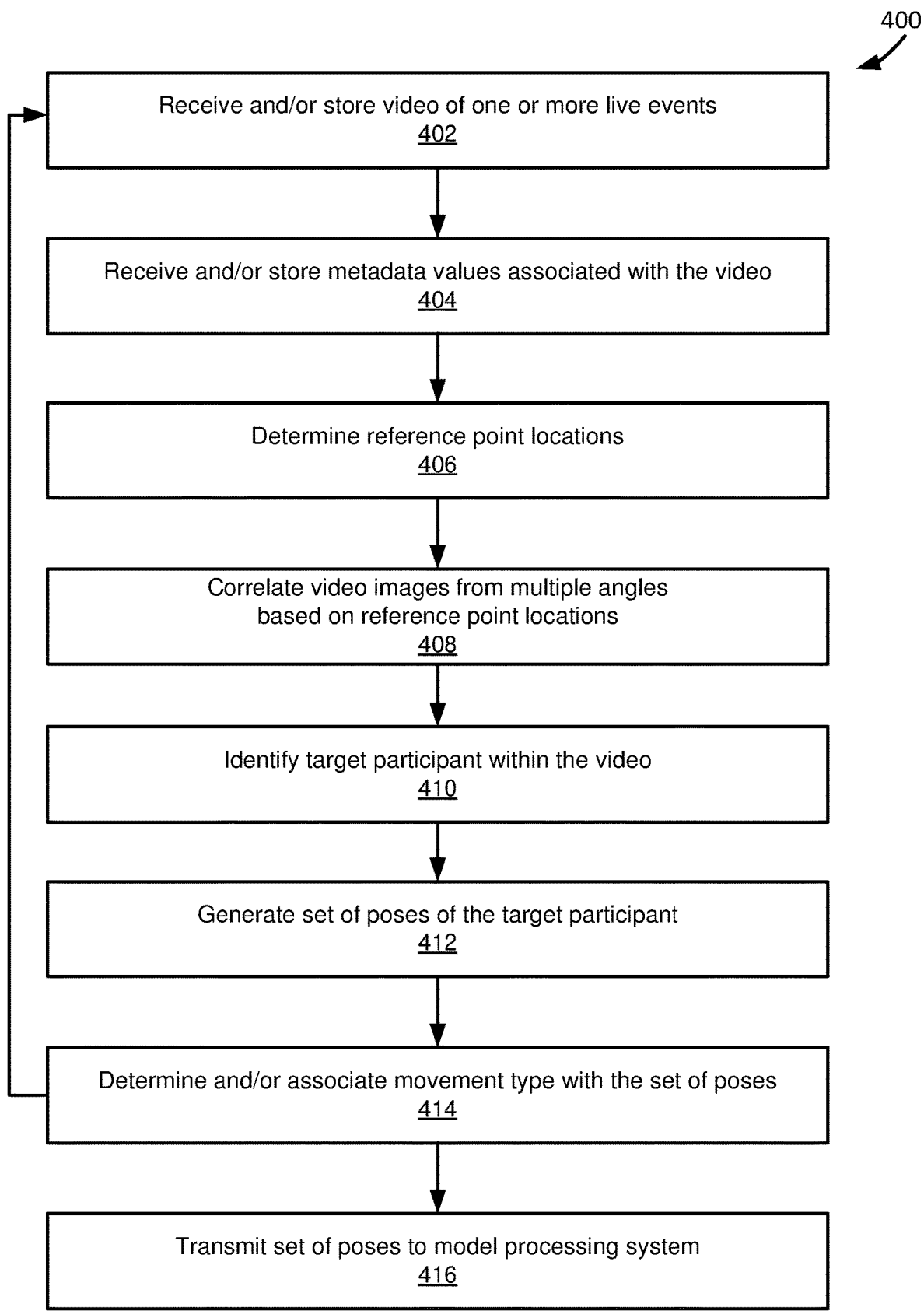
FIG. 4 is an example flowchart of an example operation of a pose generation system, in accordance with some embodiments of the present invention.

FIG. 4 is a flowchart 400 of an example method of a pose generation system (e.g., pose generation system 204) according to some embodiments.

In step 402, the pose generation system receives and stores multiple videos of one or more live events. The videos may be recorded by one or more cameras (e.g., cameras 102) from multiple camera angles. In some embodiments, a communication module (e.g., communication module 314) receives the videos and stores them in a first database (e.g., the video and metadata database 304).

In step 404, the pose generation system receives and stores metadata values associated with the videos. For example, the metadata can include the event type recorded, the number and/or configuration of the cameras, and so forth. In some embodiments, the communication module receives and stores the metadata in the first database.

In step 406, reference point locations are determined in frames of video using some or all of the metadata. For example, the metadata may include locations of hash marks, and reference point locations can be based on the hash mark locations. In some embodiments, a motion capture analysis module (e.g., the motion capture analysis module 308) determines the reference point locations.

In step 408, different camera angle images of the video are correlated (or, synchronized) based on the reference point locations. For example, the videos may include footage of the target participant performing a spin movement from six different camera angles. In order to correlate the images of the spin movement from the different angles, the motion capture analysis module may use the metadata associated with the target area to correlate the images.

In step 410, the target participant is identified (or, "selected") in the videos. In some embodiments, a user may manually identify the target participant, and/or the motion capture analysis module may identify the target participant based on one or more rules (e.g., uniform number, name, RFID tags, position on the field, etc.).

In step 412, a set of poses corresponding to a movement type by the target participant and/or game stimulus is generated from the videos and stored in a database (e.g., pose database 324). For example, a set of pose may be generated for the frames of multiple videos from the multiple camera angles during a time period. In some embodiments, a pose module (e.g., pose generation module 310) generates the set of poses.

In step 414, a movement type is associated with the set of poses. For example, in some embodiments, the movement type and/or game stimulus may be selected from a predetermined set of movement types (e.g., as defined by the movement type rules 518) and/or game stimuli (e.g., as defined by the game stimuli rules 323). In some embodiments, an administrator may manually associate a movement type and/or game stimulus, and/or the pose generation system may automatically associate a movement type and/or game stimulus. For example, a pattern matching algorithm (e.g., defined in rule 318, 322 and/or 323) may compare the set of poses with criteria that define the movement type and/or game stimulus.

In step 416, the set of poses may be transmitted to a model processing system (e.g., model processing system 206). In some embodiments, a communication module (e.g., communication model 314) transmits the set of poses (possibly in addition to the movement type and/or game stimulus) to the model processing system.

Figure 5:
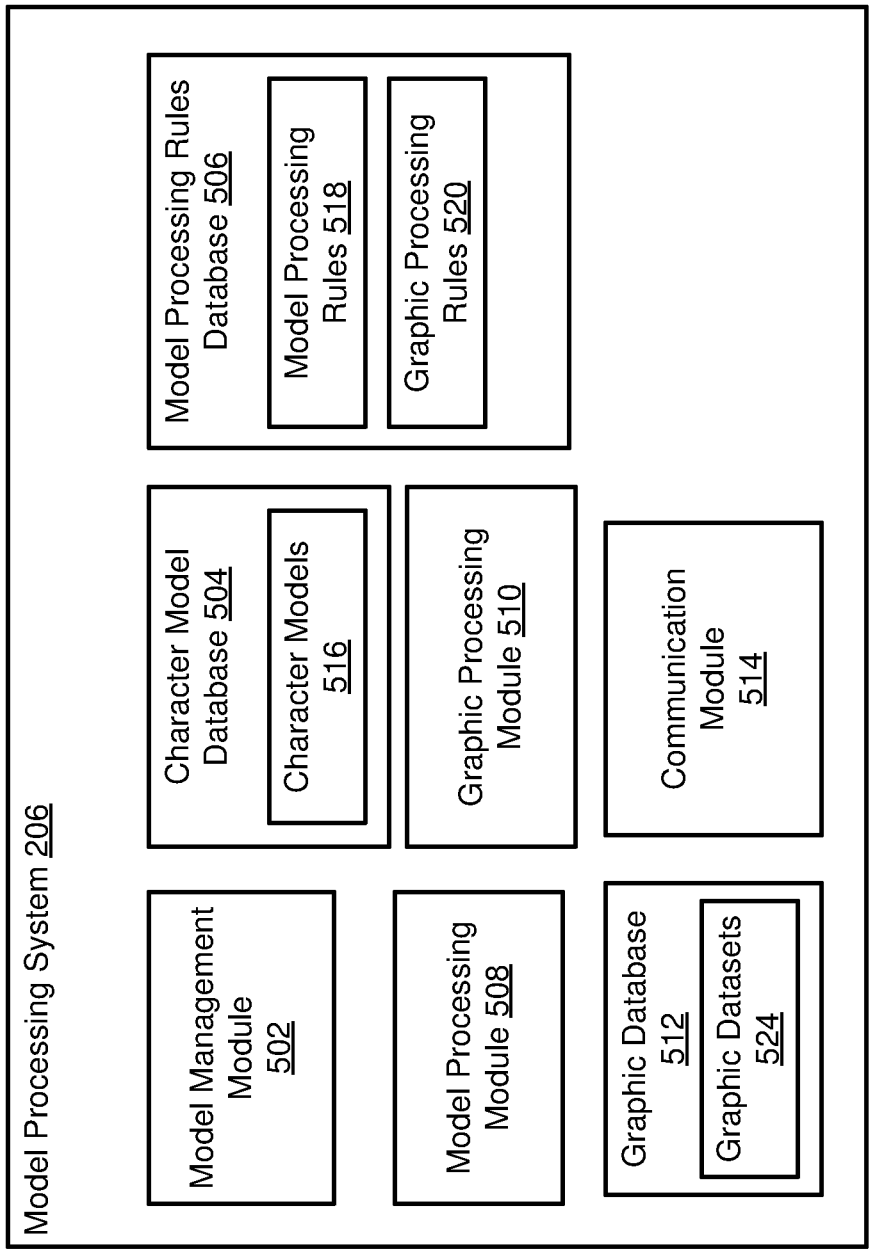
FIG. 5 is a block diagram of a model processing system, in accordance with some embodiments of the present invention.

FIG. 5 is a block diagram of a model processing system 206 according to some embodiments. Generally, the model processing system 206 may acquire a likeness of a target participant (e.g., target participant 106-1) to assist in rendering gameplay of a video game, possibly on a user device (e.g., user device 102-1). The model processing system 206 may acquire a likeness of a target participant by generating and/or customizing/refining a character model and/or graphics information (which may be or include the character model) associated with the target participant based on one or more sets of poses. The model processing system 206 may include a model management module 502, a character model database 504, a model processing rules database 506, a model processing module 508, an graphic processing module 510, a graphic database 512, and a communication module 514.

The model management module 502 is configured to manage (e.g., create, read, update, delete, or access) character models 516 stored in the character model database 504, rules 518-520 stored in the model processing rules database 506, and/or graphic datasets 524 stored in the graphic database 512. The model management module 502 may perform any of these operations either manually (e.g., by an administrator interacting with a GUI) and/or automatically (e.g., by the model processing module 508 and/or the graphic processing module 510, discussed below). In some embodiments, the model management module 502 comprises a library of executable instructions which are executable by a processor for performing any of the aforementioned management operations. The databases 504, 506 and 512 may be any structure and/or structures suitable for storing the records 516 and/or rules 518-520 (e.g., an active database, a relational database, a table, a matrix, an array, and the like).

In some embodiments, the character models 516 comprise three-dimensional character models used to assist in rendering game characters in a video game. The character models 516 may include, for example, physical, skeletal and movement characteristics of a game character to cause the game character to reflect a likeness of a real person. In some embodiments, the character models 516 may comprise preset character models, e.g., having a set of default values, and/or customized character models, e.g., based on target participants (e.g., target participant 106-1 to 106-n).

In some embodiments, the physical characteristics may include height, weight, gender, name, age, skin tone, muscle tone, facial features, facial expressions, and the like. Skeletal characteristics may include joint position, head position, etc. of the character during a particular movement. Movement data may include velocity, jump height, body angle, arm movement, and so forth. In various embodiments, a character model may include different variations for a movement type. For example, a character model may include three different variations of a spin movement, and each variation may be associated with a different set of graphics data (in some embodiments, the same physical characteristics, but different skeletal and movement characteristics).

The model processing rules database 506 stores rules 518-520 for controlling a variety of functions for the model processing system 206, including model processing rules 518 for generating and/or customizing character models 516, and graphic processing rules 520 for generating graphic datasets 524 used to render and/or display associated movements during gameplay of a video game. Other embodiments may include a greater or lesser number of such rules 518-520, stored in the rules database 506 or otherwise. In various embodiments, some or all of the rules 518-520 may be defined manually, e.g., by an administrator, and/or automatically by the model processing system 206. In some embodiments, the model processing rules 518 are part of the graphic processing rules 520. In some embodiments, there are no model processing rules 518.

In some embodiments, the rules 518-520 define one or more conditions that, when satisfied, trigger the model processing system 206, or component thereof (e.g., model processing module 508 or graphic module 510) to perform one or more actions. For example, the database 506 may store any of the following rules:

Model Processing Rules 518

The model processing rules 518 define attributes and/or functions for adjusting physical, skeletal and/or movement characteristics of the character models 516 based on one or more sets of poses (e.g., poses stored in pose records 324) to acquire a likeness of a target participant (e.g., target participant 106-1). In some embodiments, position information may be generated from each pose of a set of poses, and movement information may be generated from the positions and changes in positions. The previous character model may be adjusted to use the physical, position and movement information from the corresponding pose or set of poses for a given movement type. The customized character model can be stored (e.g., by date, movement type, etc.) and/or replace the previous character model.

The model processing module 508 is configured to execute the model processing rules 518. Thus, for example, the model processing module 508 may adjust character models 516 to reflect a likeness of a game player that represents the target participant.

Graphic Processing Rules 520

The graphic processing rules 520 define attributes and/or functions for generating graphic datasets 524 based on physical, position and movement information generated for the customized character model 516. In some embodiments, graphic datasets 524 may comprise graphics commands and/or graphics objects, three-dimensional vector datasets, and the like. For example, the graphic datasets 524 may comprise graphics commands for performing a movement style unique to a particular target participant. Additionally, the graphic datasets 524 may also comprise rendered video in addition to, or instead of, graphics commands.

The graphic processing module 510 is configured to execute the graphic processing rules 518. The graphic processing module 510 may generate and/or store graphic datasets in the graphic database 512 to assist in rendering gameplay of a video game on a user device 202. In some embodiments, the model processing module 508 may be part of the graphics processing module 510. In some embodiments, the graphics processing module 510 may generate the graphic datasets directly from the sets of poses, e.g., by evaluating the body positions across the sequence of poses.

The graphic database 512 is configured to store the graphic datasets 524 generated by the graphic module 510. In some embodiments, each dataset 524 is associated with a target participant, and may be stored based on a date, an associated movement type, and/or other criteria. For example, one or more of the graphic datasets 524 may be associated with a jump movement, wherein each of the graphic datasets is generated from a different set of movement instances associated with the target participant. Accordingly, as more graphic datasets are generated, a greater variety of movements for the different movement types may be stored and used. This may help, for example, provide a more realistic and/or engaging gaming experience in which a game characters may perform different variations of spins, jumps, and so forth, and may perform them in accordance with temporally accurate performance likeness.

The communication module 514 is configured to provide communication between the model processing 206, the pose generation system 204, the user devices 202 and/or the video capture system 100 via the network 208. The communication module 514 may also be configured to transmit and/or receive encrypted communications (e.g., VPN, HTTPS, SSL, TLS, and so forth). In some embodiments, more specifically, the communication module 514 is configured to transmit the graphic datasets 524 to one or more of the user devices 202. For example, the communication module 514 may transmit some or all of the graphic datasets 524 in response to an update request from a user device, and/or based on a predetermined schedule (e.g., daily, weekly, etc.).

Figure 6:
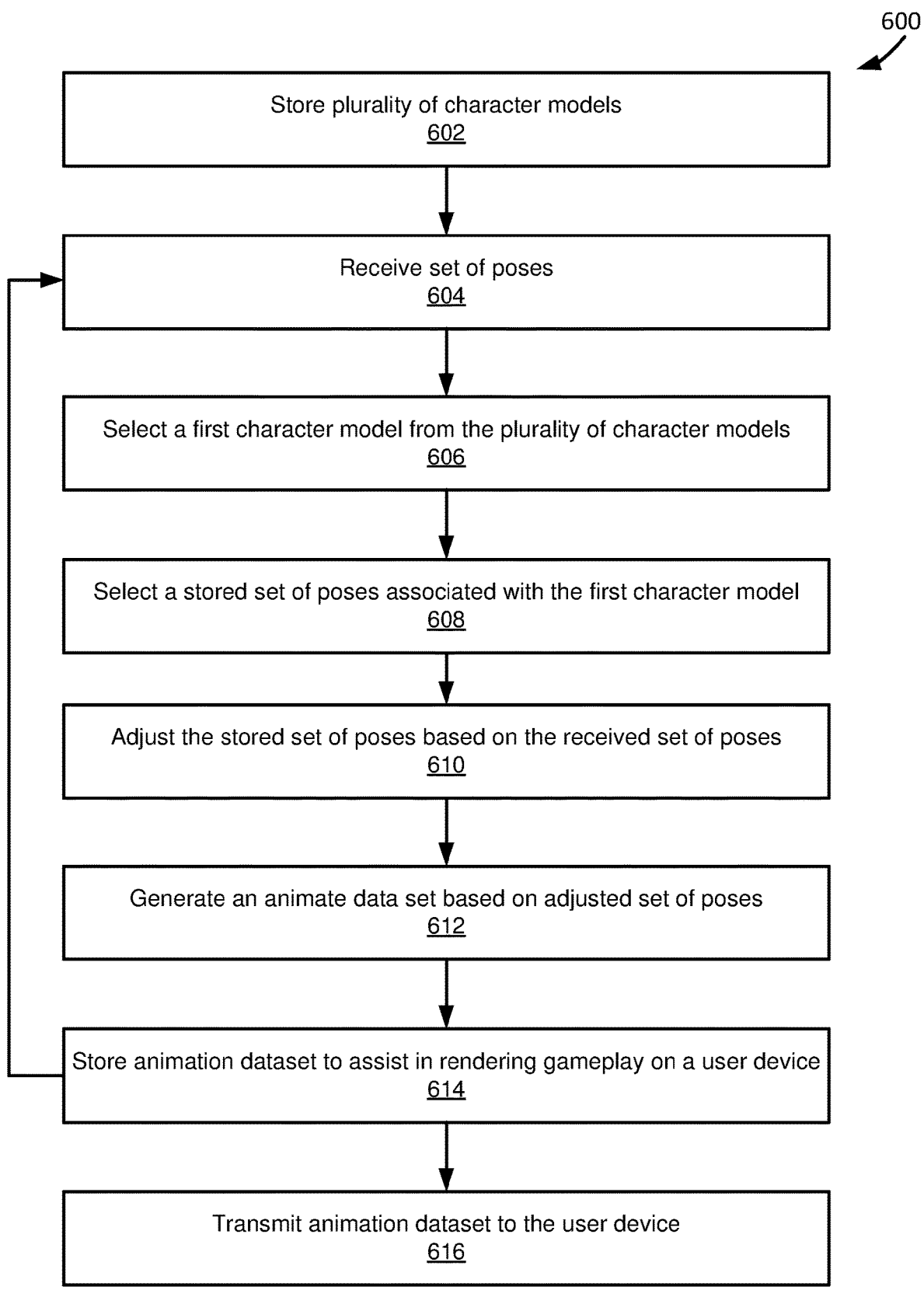
FIG. 6 is an example flowchart for an example operation of a model processing system, in accordance with some embodiments of the present invention.

FIG. 6 is an example flowchart 600 for an example operation of a model processing system (e.g., model processing system 206) according to some embodiments.

In step 602, a plurality of character models (e.g., character models 516) are stored in a character model database (e.g., character model database 504). In step 604, a set of poses is received from a pose generation system (e.g., pose generation system 204). In some embodiments, the set of poses is received by a communication module (e.g., communication module 514).

In step 606, a character model is selected from the plurality of character models based the set of poses and/or known attributes, movements and/or game stimuli associated with the set of poses. In some embodiments, a model processing module (e.g., model processing module 508) selects the character model.

In step 608, a set of poses associated with the character model is selected. The set of poses may be selected based on a movement type and/or a game stimulus. In step 610, the set of poses are adjusted to reflect a likeness of the target participant associated with the set of poses. For example, each of the poses in the set may adjusted to address shape, angles, body positions, and/or other feature(s). One or more joint angles for each of the poses may be adjusted to match, or substantially, match, the joint pose(s) of the corresponding pose. In some embodiments, the set of poses are selected and/or adjusted by the model processing module.

In step 612, a graphic dataset is generated based on a sequence of adjusted poses. In step 614, the graphic dataset is stored in a graphic database (e.g., graphic database 512) to assist in rendering gameplay of a video game on one or more user devices (e.g., user device(s) 202). In some embodiments, a graphic processing module (e.g., graphic processing module 510) generates and/or stores the graphic dataset.

In step 614, the graphic dataset (e.g., an animate dataset 524) may be transmitted to the user device(s) via a communications network (e.g., network 208). In some embodiments, a communication module (e.g., communication module 514) transmits the graphic data set to the user device(s).

FIG. 7 is a block diagram of a user device (e.g., a user device 202) according to some embodiments. The user device 700 comprises an authentication module 702, a user interface (UI) module 704, an input module 706, a simulation module 708, a rendering module 710, a display module 712, a graphic database 714, an graphic dataset module 716, and a communication module 718. Although in this embodiment, simulation and rendering are being performed on the user device 202, simulation and/or rendering can be performed elsewhere, e.g., on a game server.

In various embodiments, the authentication module 702 communicates with the model processing server 206. The authentication module 702 may communicate with the model processing server 206 via the communication network 208 when the user device 700 accesses a video game application, accesses the communication network 208, and/or upon command by the user.

The authentication module 702 may authenticate communication with the model processing system 206. The model processing system 206 may confirm that the user device 700 is authorized to receive services (e.g., graphic datasets 720). In some embodiments, the user device 700 authenticates the model processing server 206.

The user interface module 704 may provide one or more interfaces to the player. The interface may include menus or any functional objects which the player may use to provide input (e.g., indicate player preferences for the next play or game conditions). In various embodiments, the user interface module 704 generates menus and/or functional objects based on game rules and/or the current user state. For example, the game rules and/or the current user state may trigger one or more menus and/or fields to request information from the player (e.g., to identify the next play).

The input module 706 may receive the input from the user interface module 704. Input may include play selections, player choices, text, control executions (e.g., keyboard entry, joystick entry, or the like).

The simulation module 708 (or "game engine") may generate simulation results based on the user input, game rules, and/or the current game state. The game rules may indicate the simulation to execute while the current game state and the user input may provide parameters which may affect the simulation result. In some embodiments, simulation is performed by a remote game server (not shown).

The graphic dataset module 716 may select graphic datasets 720 to assist with rendering gameplay. The graphic datasets 720 may be stored locally on the user device 700 and/or remotely, e.g., on the model processing server 206. In some embodiments, an graphic dataset is selected based on a traversal of a motion graph. Each dataset 720 may comprise a node of the motion graph. When a game character is scheduled to perform a series of movements during gameplay based on user input and/or simulation results, e.g., as determined by the simulation module 708, the motion graph may be traversed to find the best matching graphic datasets for the series of movements. For example, the motion graph may receive as input a starting pose of the character and a desired endpoint. Based on the starting pose and the desired endpoint, the graphic dataset module 716 may select one or more of the graphic datasets 720 to assist with rendering the series of movements.

In some embodiments, multiple graphic datasets 720 may be associated with a single movement type. For example, a particular game character may be able to perform multiple variations of a spin movement. In some embodiments, a probability matrix may be used to select the movement variation, and associated graphic dataset, to use to render the movement type. The graphic dataset module 716 may look at historical information associated with the target participant upon which the game character is based (e.g., Marshawn Lynch) to determine that a particular spin variation is performed more frequently than the other spin variations. The graphic dataset module 716 may look to the current game circumstances to determine whether game stimuli condition has been met. The graphic dataset module 716 may select that particular spin variation relative to other available spin variations in accordance with his actual use. The graphic dataset module 716 may select particular variations to introduce variety. The graphic dataset module 716 may select particular variations because they fit the simulated results best. Other criteria for selecting graphic datasets are also possible.

The rendering module 710 renders gameplay. The perspective(s) and/or viewpoint(s) of the rendered video may be identified from the game rules, the user device 700 (e.g., limitations of rendering resources such as limited memory or GPU, size of screen of user device 700, and/or other limitations such as resolution), and user point of view (e.g., based on the player's point of view in the game), and/or player preferences (which may indicate a preference for one or more views over others). In various embodiments, rendering may be performed by a remote digital device (not shown).

The rendering module 710 may render gameplay based, at least in part, on graphic datasets 720 selected by the graphic dataset module 716.

The display module 712 is configured to display the rendered gameplay. The display module 712 may comprise, for example, a screen.

The communication module 718 may provide authentication requests, user inputs, requests for graphic datasets 720, and so forth, to another digital device (e.g., the model processing system 206). The communication module 718 may also receive graphic datasets, and/or information to perform simulations (e.g., the communication module 718 may receive game state information and/or user inputs from other user devices in a multiplayer game).

Those skilled in the art will appreciate that the user device 700 may comprise any number of modules. For example, some modules may perform multiple functions. Further, in various embodiments, multiple modules may work together to perform one function. In some embodiments, the user device 700 may perform more or less functionality than that described herein.

Figure 8:
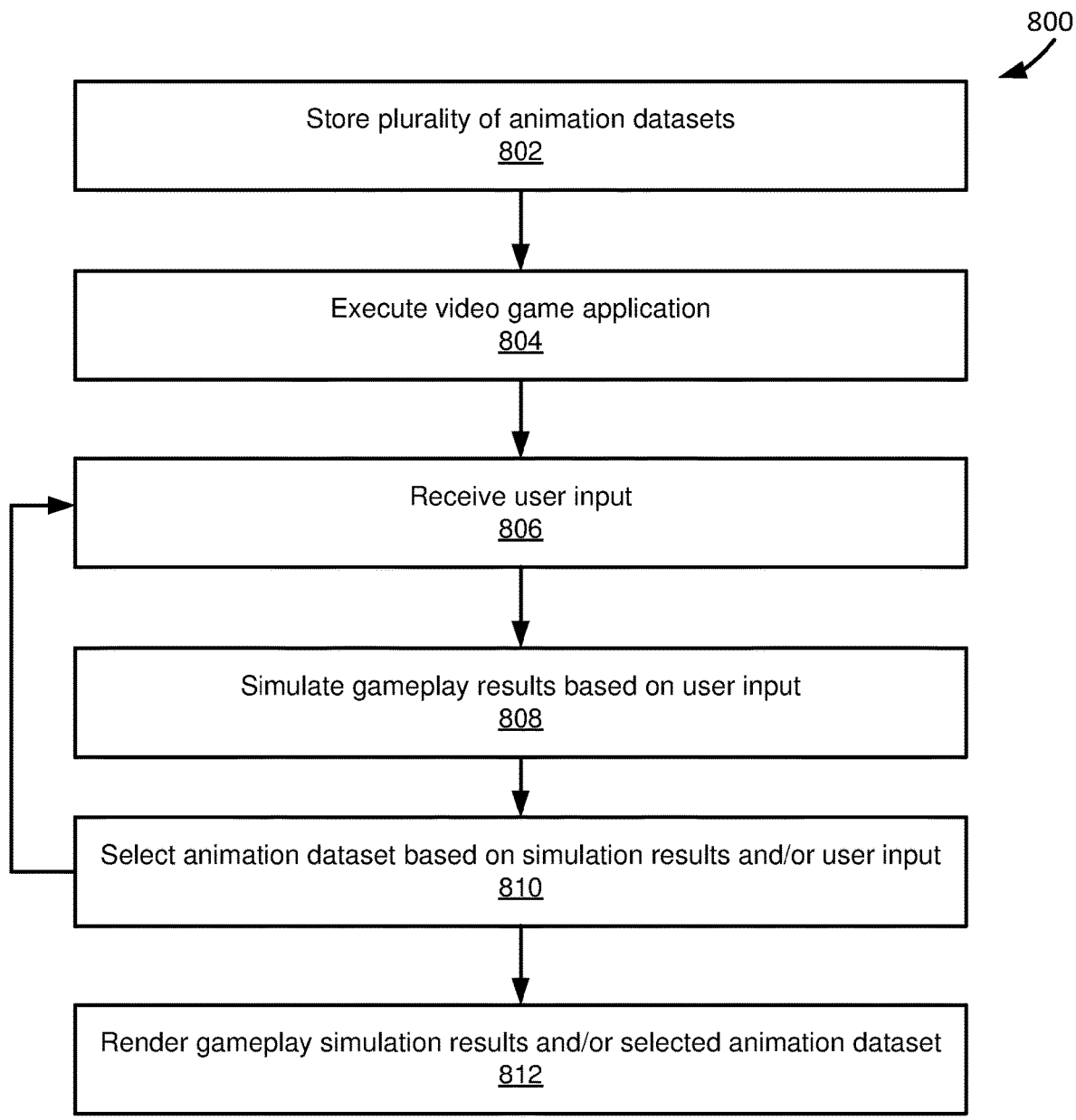
FIG. 8 is an example flowchart of an example operation of a user device, in accordance with some embodiments of the present invention.

FIG. 8 is an example flowchart 800 of an example operation of a user device (e.g., a user device 700) according to some embodiments.

In step 802, graphic datasets (e.g., graphic data sets 720) are stored in a graphic database (e.g., graphic database 714). In some embodiments, the graphic datasets may be received from a model processing system (e.g., model processing system 206) by a communication module (e.g., communication module 718).

In step 804, a video game application (e.g., EA Sports Madden Football) is executed on the user device. In some embodiments, the simulation module 708 may launch the video game application. In step 806, user input is received from a user to effect gameplay of the video game. In some embodiments, the user input is received via a user interface module (e.g., user interface module 704) and/or an input module (e.g., input module 706).

In step 808, gameplay is simulated based on the received user input. For example, the input may comprise a series of commands, e.g., sprint, run left, jump, etc., and the simulation module may simulate gameplay results based on those commands. The gameplay results may include game circumstances that motivate player behavior.

In step 810, one or more graphic datasets is selected from the plurality of stored graphic datasets based on the user input and/or simulation results. In some embodiments, the one or more graphic datasets is selected by an graphic dataset module (e.g., graphic dataset module 716).

In step 812, the gameplay simulation results in accordance with the selected one or more graphic datasets are rendered and displayed to the user. In some embodiments, the simulation results in accordance with the selected one or more graphic datasets are rendered by a rendering module (e.g., rendering module 710) and displayed by a display module (e.g., display module 712).

Figure 9:
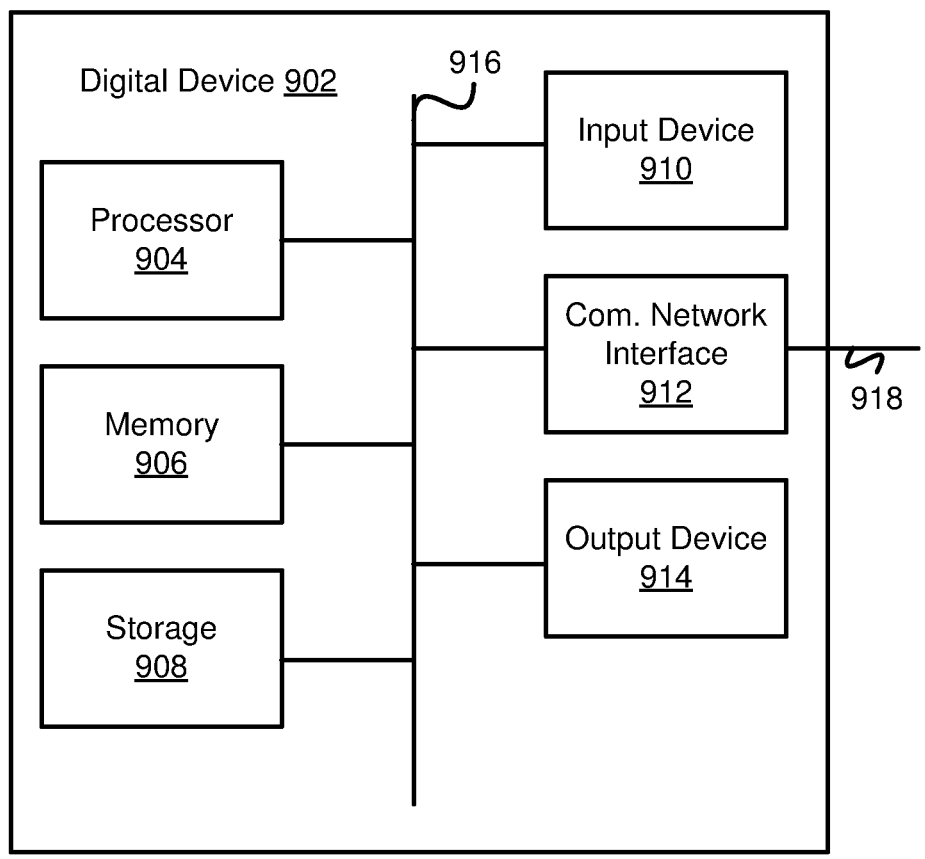
FIG. 9 is a block diagram of a digital device, in accordance with some embodiments of the present invention.

FIG. 9 is a block diagram of a digital device 902 according to some embodiments. Any of the user devices 202, pose generation system 204, and/or model processing server 206 may be an instance of the digital device 902. The digital device 902 comprises a processor 904, memory 906, storage 908, an input device 910, a communication network interface 912, and an output device 914 communicatively coupled to a communication channel 916. The processor 904 is configured to execute executable instructions (e.g., programs). In some embodiments, the processor 904 comprises circuitry or any processor capable of processing the executable instructions.

The memory 906 stores data. Some examples of memory 906 include storage devices, such as RAM, ROM, RAM cache, virtual memory, etc. In various embodiments, working data is stored within the memory 906. The data within the memory 906 may be cleared or ultimately transferred to the storage 908.

The storage 908 includes any storage configured to retrieve and store data. Some examples of the storage 908 include flash drives, hard drives, optical drives, and/or magnetic tape. Each of the memory system 906 and the storage system 908 comprises a computer-readable medium, which stores instructions or programs executable by processor 904.

The input device 910 is any device that inputs data (e.g., mouse and keyboard). The output device 914 outputs data (e.g., a speaker or display). It will be appreciated that the storage 908, input device 910, and output device 914 may be optional. For example, the routers/switchers may comprise the processor 904 and memory 906 as well as a device to receive and output data (e.g., the communication network interface 912 and/or the output device 914).

The communication network interface 912 may be coupled to a network (e.g., network 108) via the link 918. The communication network interface 912 may support communication over an Ethernet connection, a serial connection, a parallel connection, and/or an ATA connection. The communication network interface 912 may also support wireless communication (e.g., 602.11 a/b/g/n, WiMax, LTE, WiFi). It will be apparent that the communication network interface 912 can support many wired and wireless standards.

It will be appreciated that the hardware elements of the digital device 902 are not limited to those depicted in FIG. 9. A digital device 902 may comprise more or less hardware, software and/or firmware components than those depicted (e.g., drivers, operating systems, touch screens, biometric analyzers, etc.). Further, hardware elements may share functionality and still be within various embodiments described herein. In one example, encoding and/or decoding may be performed by the processor 904 and/or a co-processor located on a GPU (i.e., NVidia).

It will be appreciated that although the example method steps 402-416, 602-616, and 802-812 are described above in a specific order, the steps may also be performed in a different order. Each of the steps may also be performed sequentially, or serially, and/or in parallel with one or more of the other steps. Some embodiments may include a greater or lesser number of such steps.

It will further be appreciated that a "device," "system," "module," and/or "database" may comprise software, hardware, firmware, and/or circuitry. In one example, one or more software programs comprising instructions capable of being executable by a processor may perform one or more of the functions of the modules, databases, or agents described herein. In another example, circuitry may perform the same or similar functions. Alternative embodiments may comprise more, less, or functionally equivalent modules, agents, or databases, and still be within the scope of present embodiments. For example, as previously discussed, the functions of the various systems, devices, modules, and/or databases may be combined or divided differently.

The present invention(s) are described above with reference to example embodiments. It will be apparent to those skilled in the art that various modifications may be made and other variations can be used without departing from the broader scope of the present invention(s). Therefore, these and other variations upon the example embodiments are intended to be covered by the present invention(s).

The invention claimed is:

1. A system comprising:
a memory comprising instructions; and
a processor configured to execute the instructions to:
correlate video images from a plurality of camera angles based on reference point locations;
identify a target participant using multiple cameras at the plurality of camera angles during at least one live event;
generate a set of poses of the target participant based on poses of a character model selected from a stored set of poses for the character model, the selection based on a movement type or game stimulus;
generate a graphic dataset for the movement type or game stimulus based on the generated set of poses; and
store the graphic dataset to assist in rendering a game character representative of the target participant during gameplay of a video game.

2. The system of claim 1, wherein the multiple cameras capture multiple videos of the at least one live event, the multiple videos comprising television broadcast videos of a plurality of live events, the television broadcast videos including video footage of the target participant from the plurality of camera angles for at least a portion of each of the plurality of live events.

3. The system of claim 1, wherein the multiple cameras capture multiple videos of the at least one live event, and wherein the target participant is identified at least partially based on metadata associated with the multiple videos.

4. The system of claim 3, wherein the metadata includes at least one of RFID tracking information associated with the target participant, a uniform number associated with the target participant, a player name associated with the target participant, or a field position associated with the target participant.

5. The system of claim 1, wherein the movement type or game stimulus is selected from predetermined movement types or game stimuli.

6. The system of claim 1, wherein the graphic dataset is generated by customizing the character model with physical, skeletal and movement characteristics generated from the stored set of poses.

7. The system of claim 1, wherein the graphic dataset includes position information associated with the movement type or game stimulus.

8. The system of claim 1, wherein the graphic dataset includes a customized character model associated with the target participant.

9. The system of claim 1, wherein the multiple cameras capture multiple videos of the at least one live event, and wherein the processor is further configured to execute the instructions to receive information identifying a time period within the multiple videos that corresponds to the movement type or game stimulus.

10. The system of claim 1, wherein the processor is further configured to execute the instructions to:
generate simulation results based on user input and game rules; and
use the graphic dataset to render the simulation results so that the game character representative of the target participant performs a movement clip that includes a likeness of the target participant.

11. A computerized method comprising:
correlating video images from a plurality of camera angles based on reference point locations;

identifying a target participant using multiple cameras at the plurality of camera angles during at least one live event;

generating a set of poses of the target participant based on poses of a character model selected from a stored set of poses for the character model, the selection based on a movement type or game stimulus;

generating a graphic dataset based on the set of poses; and storing the graphic dataset to assist in rendering gameplay of a video game.

12. The method of claim 11, wherein the multiple cameras capture multiple videos of the at least one live event, and wherein the multiple videos comprise television broadcast video of a plurality of live events, the television broadcast video including video footage of the target participant from the plurality of camera angles for at least a portion of each of the plurality of live events.

13. The method of claim 11, wherein the multiple cameras capture multiple videos of the at least one live event, and wherein the target participant is identified at least partially based on metadata associated with the multiple videos.

14. The method of claim 13, wherein the metadata includes any of RFID tracking information associated with the target participant, a player number associated with the target participant, or a player name associated with the target participant.

15. The method of claim 11, wherein the movement type or game stimulus is selected from predetermined movement types or game stimuli.

16. The method of claim 11, wherein the generating the graphic dataset includes customizing the character model based on physical, skeletal and movement characteristics generated from the stored set of poses.

17. The method of claim 11, wherein the graphic dataset includes position information associated with the movement type or game stimulus, or includes a customized character model associated with the target participant.

18. The method of claim 11, wherein the multiple cameras capture multiple videos of the at least one live event, and the method further comprising receiving information identifying a time period within the multiple videos that corresponds to the movement type or game stimulus.

19. The method of claim 11, further comprising:

generating simulation results based on user input and game rules; and using the graphic dataset to render the simulation results so that a game character representative of the target participant performs a movement clip that includes a likeness of the target participant.

20. A non-transitory computer readable medium comprising executable instructions, the instructions being executable by a processor to perform a method, the method comprising:

correlating video images from a plurality of camera angles based on reference point locations;

identifying a target participant using multiple cameras at the plurality of camera angles during at least one live event;

generating a set of poses of the target participant based on poses of a character model selected from a stored set of poses for the character model, the selection based on a movement type or game stimulus;

generating a graphic dataset based on the generated set of poses; and storing the graphic dataset to assist in rendering gameplay of a video game.

* * * * *